June 4, 1963   H. B. BENNETT ET AL   3,092,711
MANUFACTURE OF HONEYCOMB CORE
Filed Sept. 8, 1958   9 Sheets-Sheet 1

INVENTORS
*HARRY B. BENNETT*
*HUGHES W. VAUGHN*
BY
*Barnes, Kisselle, Raisch*
*& Choate*

June 4, 1963  H. B. BENNETT ET AL  3,092,711
MANUFACTURE OF HONEYCOMB CORE
Filed Sept. 8, 1958  9 Sheets-Sheet 2
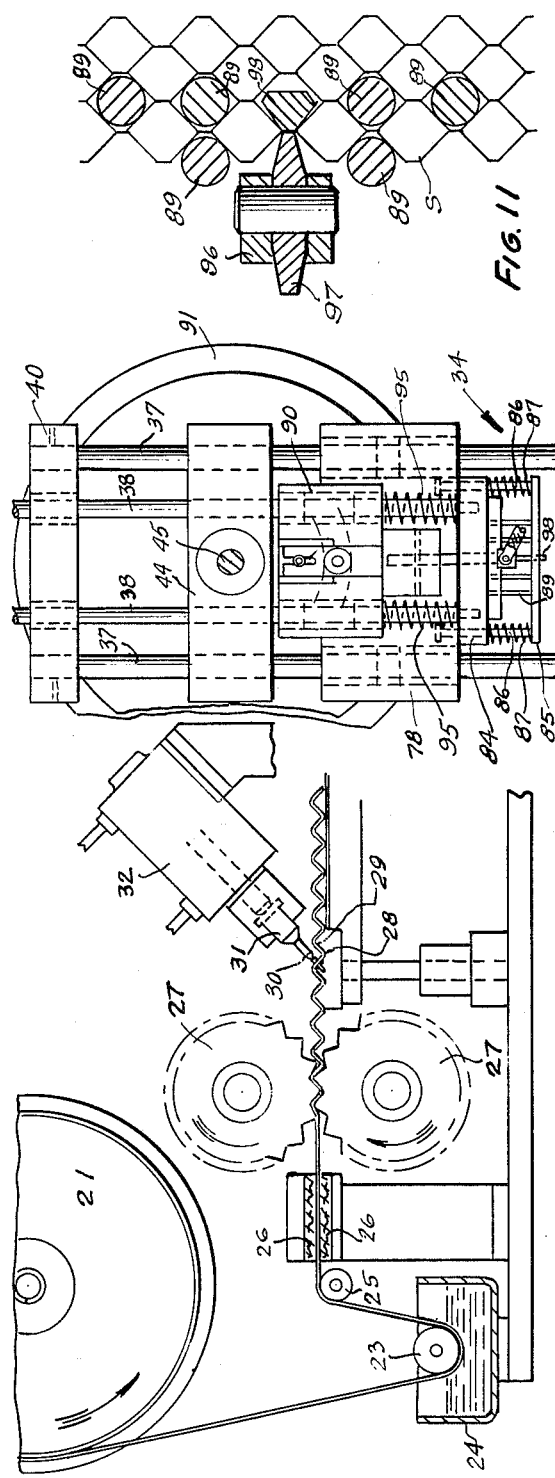
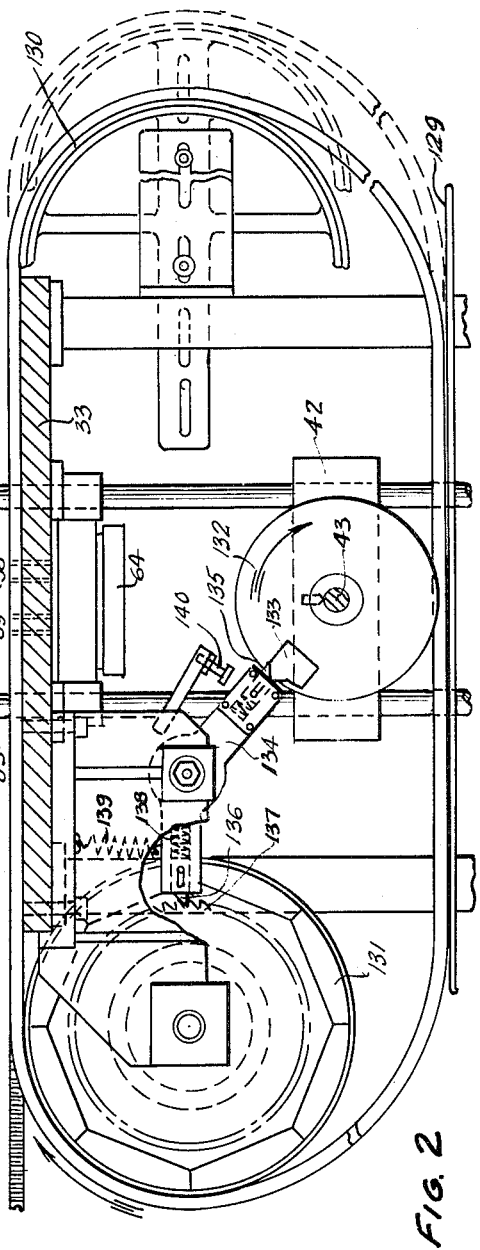
INVENTORS
HARRY B. BENNETT
HUGHES W. VAUGHN
BY
Barnes, Kisselle, Raisch
& Choate

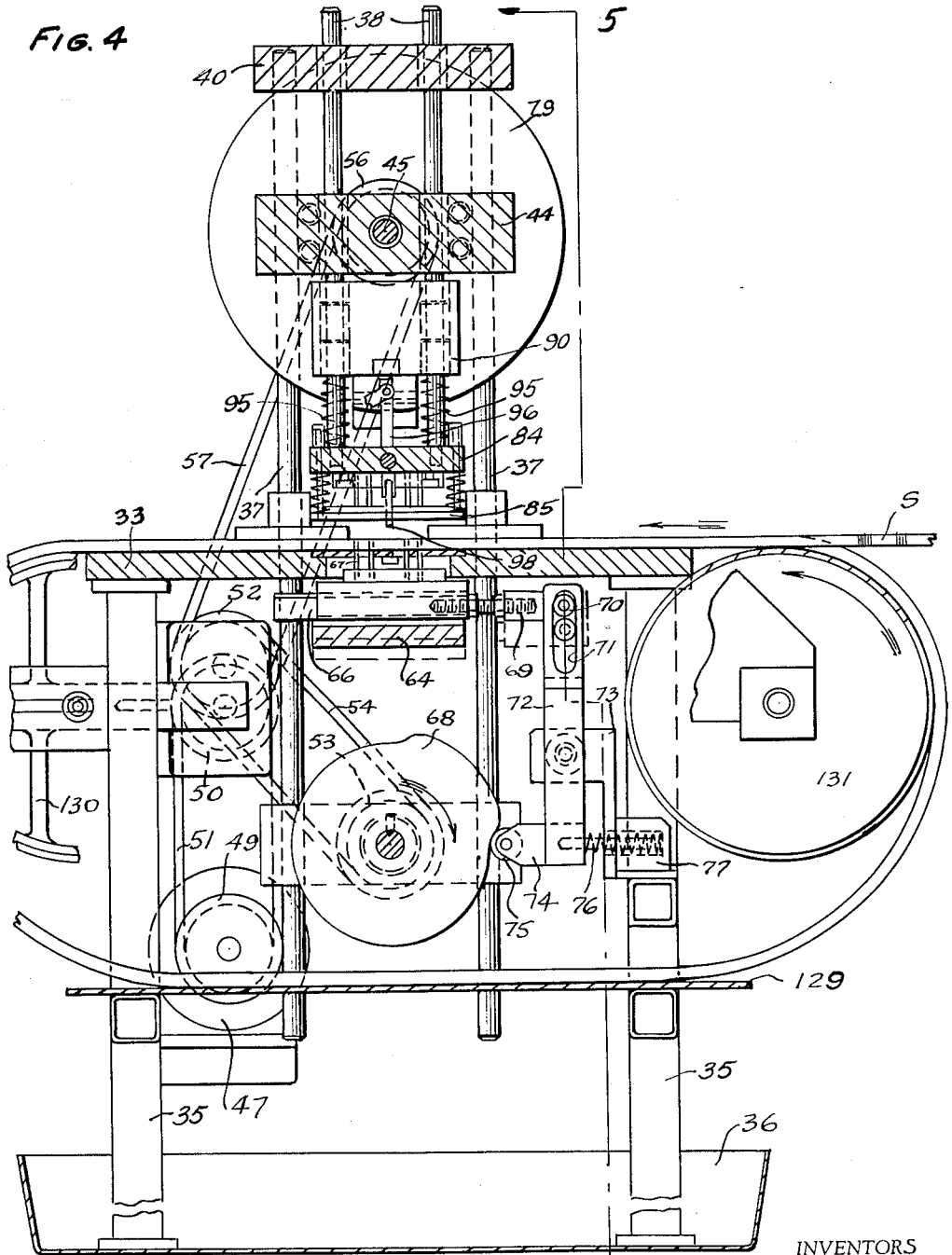

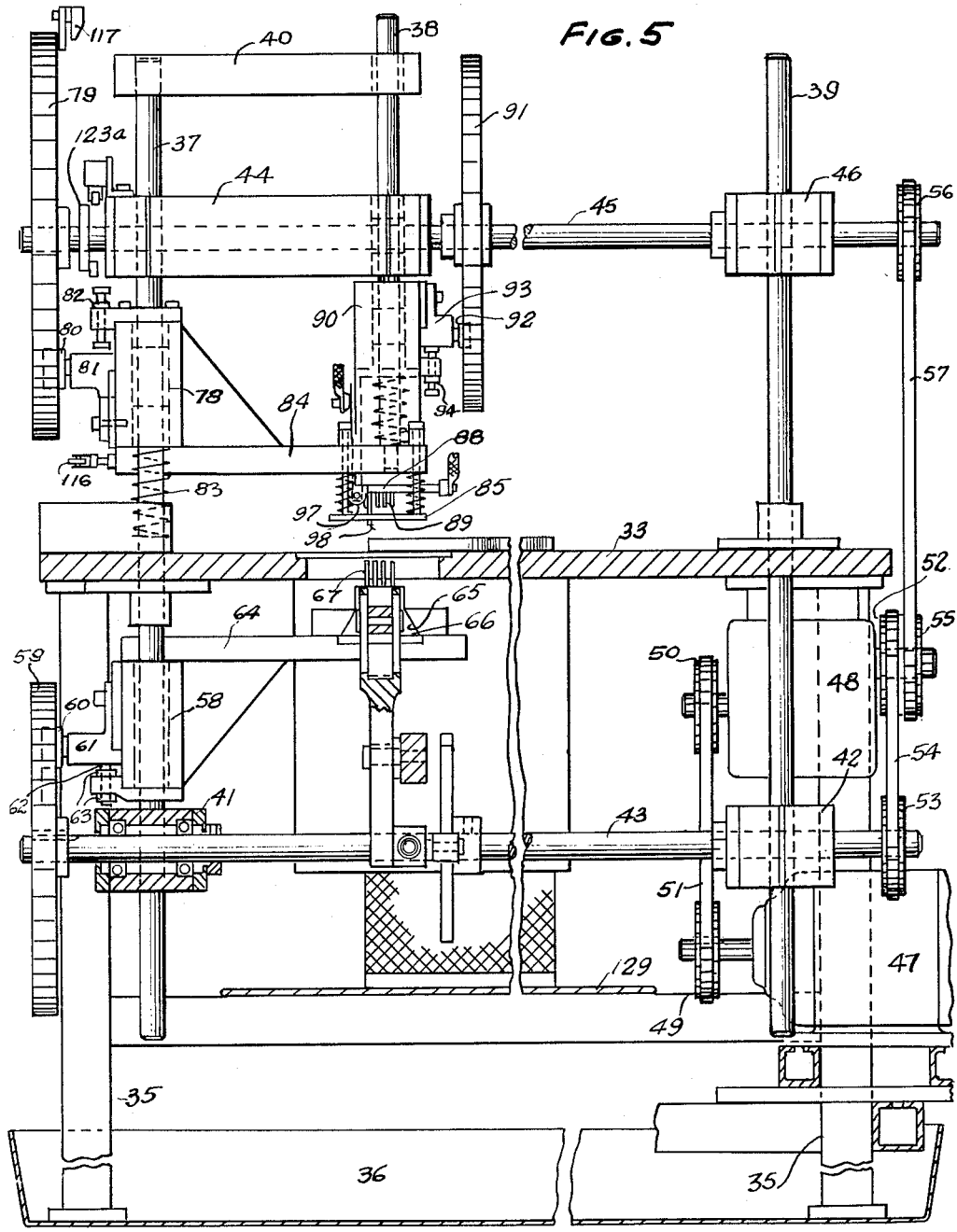

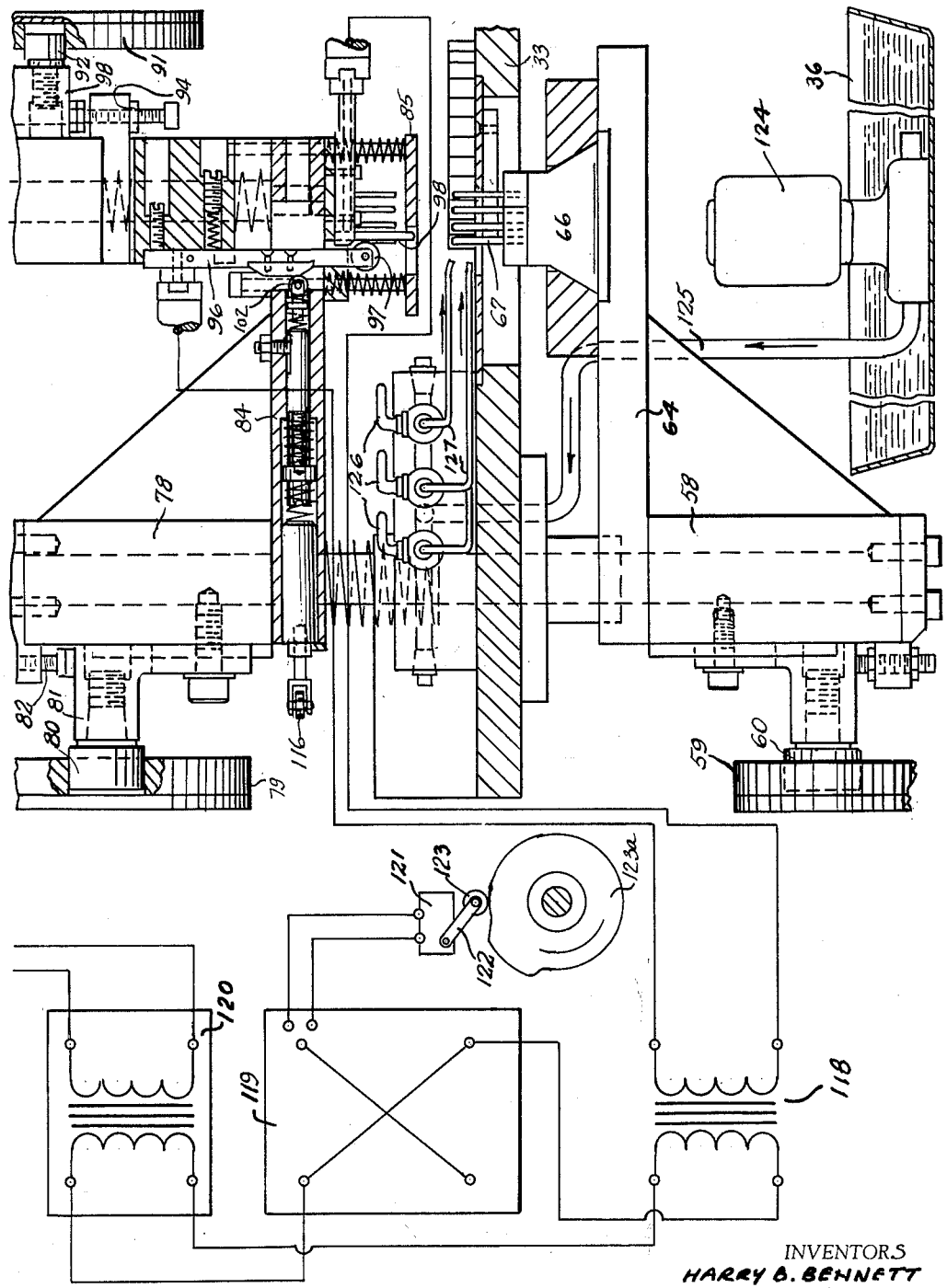

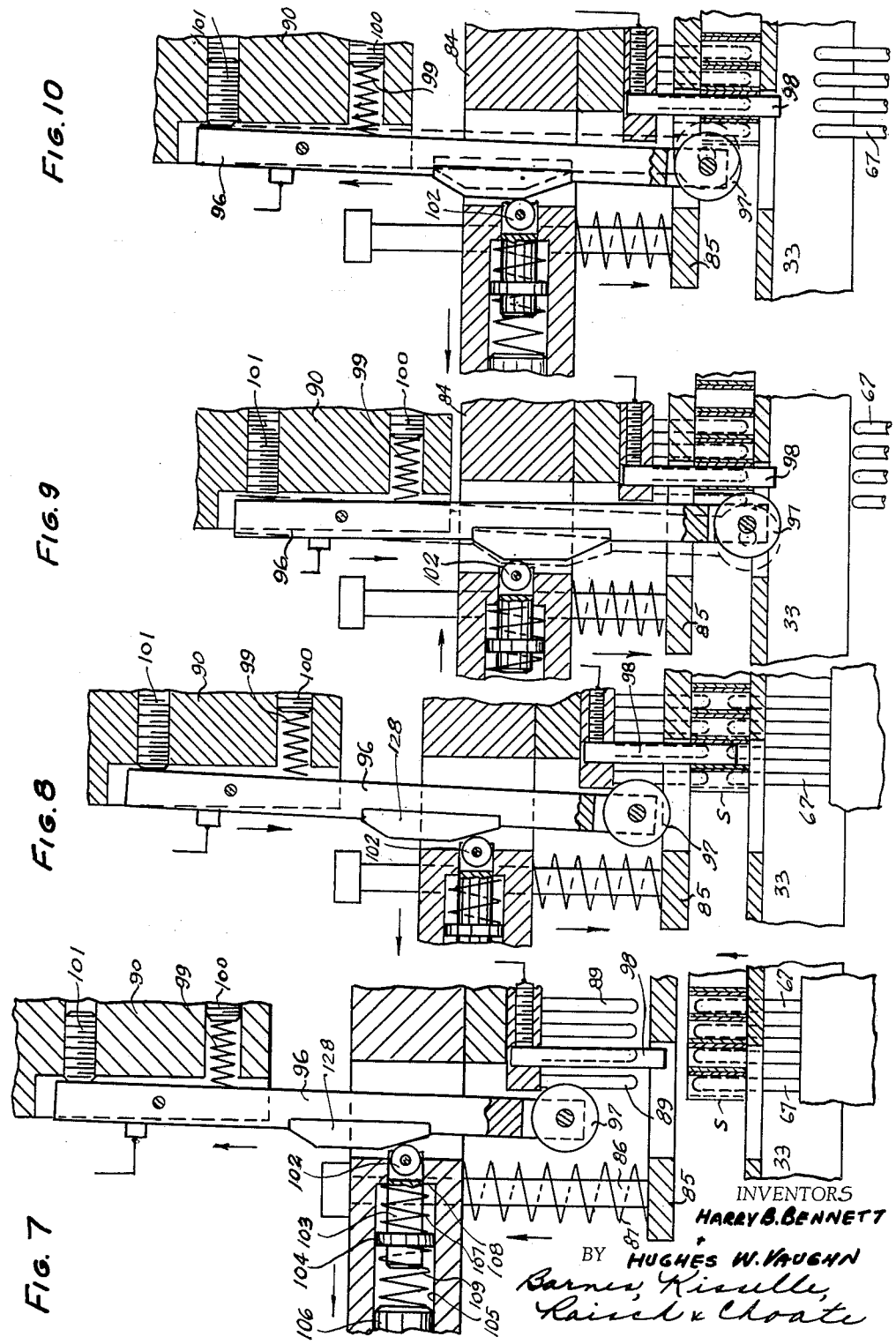

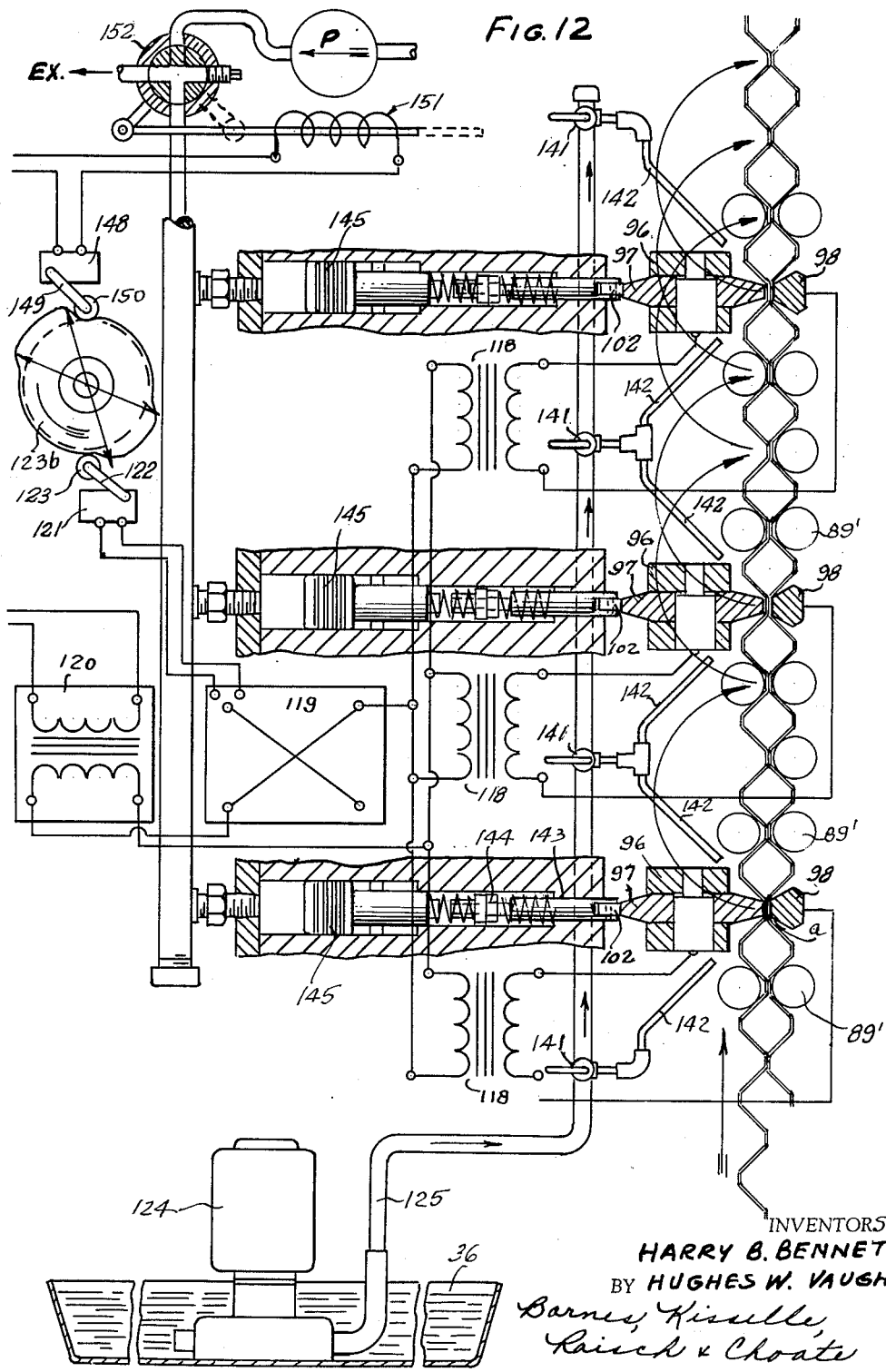

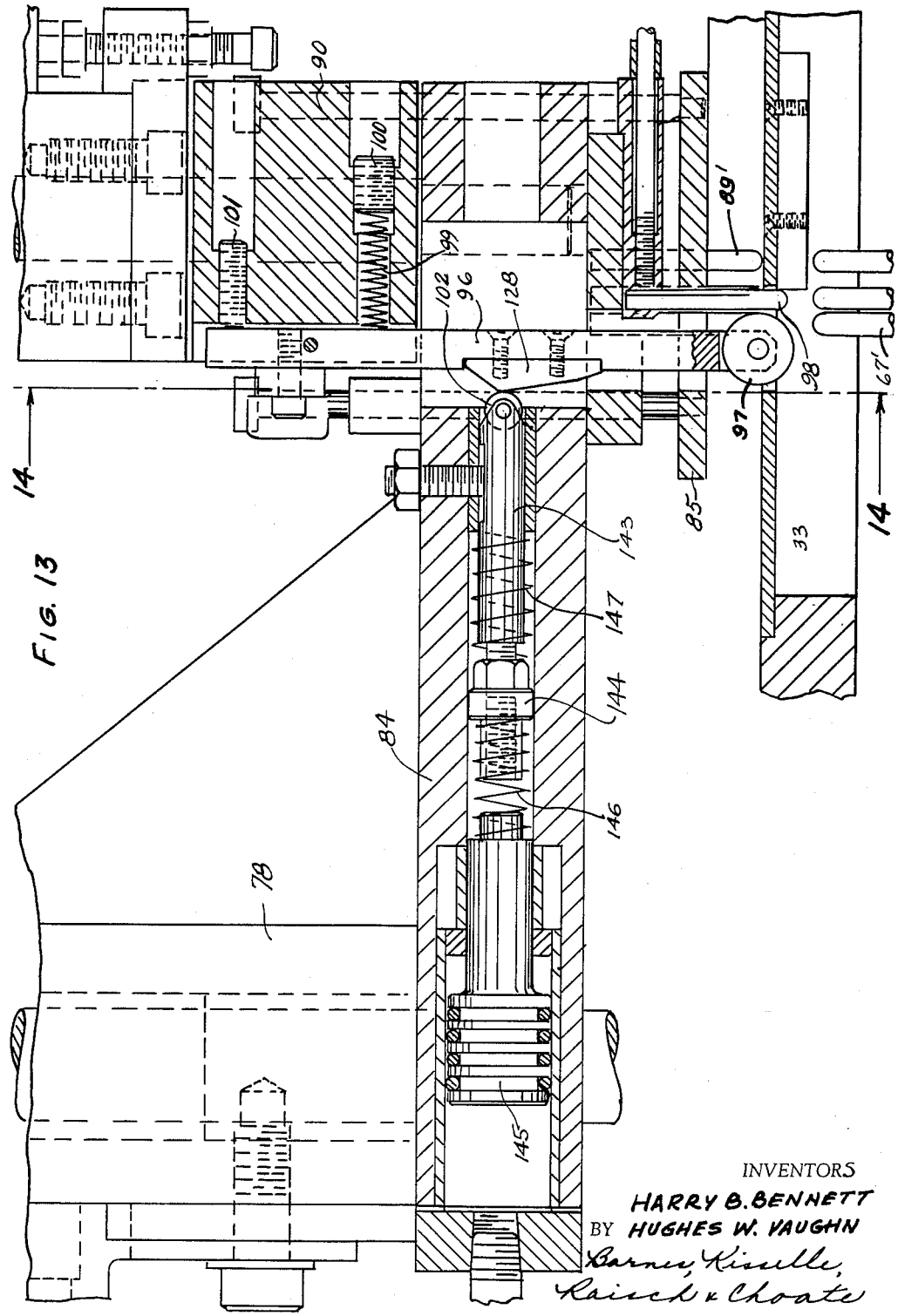

INVENTORS
HARRY B. BENNETT
HUGHES W. VAUGHN

United States Patent Office 3,092,711
Patented June 4, 1963

3,092,711
MANUFACTURE OF HONEYCOMB CORE
Harry B. Bennett, Bloomfield Hills, and Hughes W. Vaughn, Garden City, Mich.; said Vaughn assignor of twenty percent to said Bennett
Filed Sept. 8, 1958, Ser. No. 759,562
23 Claims. (Cl. 219—81)

This invention relates to the manufacture of honeycomb core and particularly to the manufacture of honeycomb core from strips of corrugated metal welded together.

The use of a plurality of strips of corrugated material bonded together at the crests of the corrugations and thereby forming a honeycomb core for structural purposes has developed rapidly in the last few years. When the honeycomb core is made of metal foil, it is particularly adaptable for use in aircraft. Large quantities of honeycomb core made of an aluminum foil with the crests bonded by an adhesive have been used for such purpose. Although aluminum honeycomb core made in this manner is quite strong and satisfactory for many aircraft applications, it is not resistant to high temperature; and therefore, it is not possible to use such aluminum honeycomb core in high altitude aircraft and missiles which are subjected to high temperature.

It has heretofore been suggested that honeycomb core made of stainless steel foil having the crests welded together would produce a satisfactory material which can be used under high temperature conditions. Core of this type has been used to a limited extent; but because of difficulties in manufacture, it has not been heretofore possible to obtain honeycomb core of sufficient uniformity and high quality. In addition, prior methods and machines for manufacture of such honeycomb core have been of low productive capacity; and therefore, the cost of manufacture of the core has been high, if not prohibitive.

It is an object of this invention to provide a method and apparatus for making honeycomb core of great uniformity and high quality.

It is a further object of this invention to provide such a method and apparatus wherein the honeycomb core can be made at relatively high production rates.

It is a further object of the invention to provide such a method and apparatus for making honeycomb core by welding the crests of corrugated metal strips together after their assembly.

It is a further object of the invention to provide a method and apparatus for making honeycomb core which has a uniform high quality weld at abutting crests of the corrugated strips comprising the core.

It is a further object of the invention to provide a novel apparatus for feeding the core material successively through a welding station.

It is a further object of the invention to provide a novel apparatus for moving an endless web of core material.

It is a further object of the invention to provide a novel method and apparatus for simultaneously welding a plurality of crests of adjacent strips of corrugated metal foil to one another, after their assembly.

It is a further object of the invention to provide a novel apparatus for providing perforations in a corrugated strip of metal foil.

In the drawings:

FIG. 2 is a fragmentary sectional view taken along the line 2—2 in FIG. 1.

FIG. 3 is a fragmentary elevation of another part of the apparatus embodying the invention.

FIG. 4 is a fragmentary sectional view taken along the line 4—4 in FIG. 1.

FIG. 5 is a fragmentary sectional view taken along the line 5—5 in FIG. 4.

FIG. 6 is a partly diagrammatic sectional view of the apparatus shown in FIG. 1 including the electrical wiring diagram and the liquid cooling arrangement.

FIGS. 7, 8, 9 and 10 are fragmentary sectional views on an enlarged scale of a portion of the apparatus shown in FIG. 6 showing the parts in various relative positions in the making of the honeycomb core.

FIG. 11 is a fragmentary plan view on an enlarged scale showing the relative positions of the parts during welding.

FIG. 12 is a partly diagrammatic view of a modified form of the apparatus including a wiring diagram and a liquid cooling diagram.

FIG. 13 is a fragmentary sectional view similar to FIG. 6 of a modified form of the apparatus.

Figure 1:
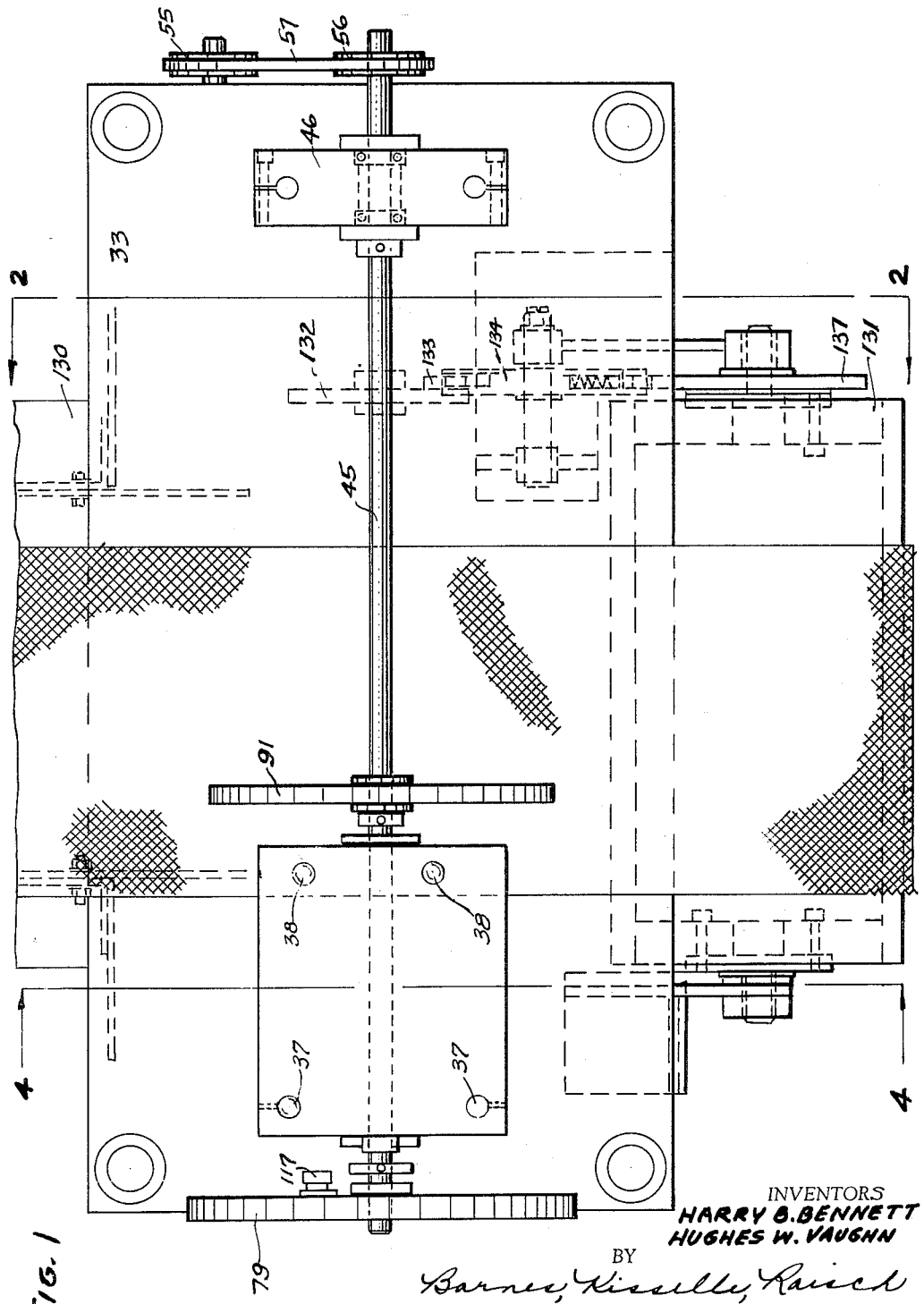
FIG. 1 is a fragmentary plan view of an apparatus embodying the invention.

Basically, the method comprises first corrugating a strip of metal foil such as stainless steel and thereafter bringing the end of the strip into contact with an intermediate portion of the strip to form an endless web. The crests of successive portions of the strip are then brought into contact with the crests of the endless web and welded thereto to form ever-increasing width of honeycomb core in an endless web.

Referring to FIG. 3, a support carries a supply roll 21 of metal foil. The metal foil may comprise stainless steel and may vary in width over wide limits, for example, from 1/4 inch to 8 inches and in thickness from 0.001 to 0.010 inch. The resultant cell size of the honeycomb core may vary widely, for example, from 1/8 to 1 inch in diameter.

The strip of metal foil from supply roll 21 passes under an idler roll 23 submerged in a cleaning bath 24 and thereafter over an idler roll 25 between wiper pads 26. From there, the strip passes between corrugating rolls 27 which are driven in a manner not shown to pull successive portions of the strip from the supply roll 21 and form corrugations therein. The teeth of the corrugating rolls 27 may be of any desired configuration, depending on the desired configuration of the cells in the honeycomb core. For example, the teeth may be triangular resulting in a square cell, or the teeth may have broad flat apexes resulting in a hexagonal cell. After being formed with corrugations, the strip passes over a mandrel 28 which has teeth 29 of the same configuration as the corrugations. A perforating pin 30 is periodically moved into contact with the side portions of the corrugations between the crests to perforate the strip. Pin 30 is mounted on the shaft 31 of a piston motor 32, the operation of which is controlled by a timing device, not shown. The perforations in the corrugated strip are required in various uses of the honeycomb core and serve as vent holes for the passage of gases. The perforations may be on the order of .025" in diameter.

After the strip is corrugated, it is passed over a table in edgewise relationship thereto; that is, with the crests of the corrugations extending vertically. As previously mentioned, in the beginning of the operation, the strip is looped beneath table 33 and the end of the strip is fashioned to an intermediate portion thereof to form the first endless portion of an endless web. Table 33 is provided with a welding station 34 at which the adjacent crests of corrugated strip are welded together.

As shown in FIGS. 4 and 5, table 33 is supported by vertical struts 35, the lower ends of which rest in a pan 36. Longitudinally aligned pairs of vertical posts 37 and 39 are fixed and supported at spaced points transversely on table 33 (FIG. 1). The upper ends of posts 37 extend through a plate 40 and the plate is fixed thereto by set screws. Another pair of posts 38 is slidably mounted in plate 40. As shown in FIG. 5, a journal support 41 is mounted on posts 37 below table 33 and a journal support 42 is mounted on posts 39 below table 33. These supports 41, 42 rotatably mount a lower horizontal shaft 43. A journal support 44 is mounted on the posts 37 above table 33 and a journal support 46 is provided on the posts 39 above table 33 to rotatably support a horizontal shaft 45.

Shafts 43 and 45 are driven continuously by a driving connection from electric motor 47. Motor 47 drives a gear box 48 through a pulley 49 keyed to the shaft of the motor, a pulley 50 keyed to the input shaft of the gear box 48 and an endless belt 51 trained over pulleys 49, 50. The driving connection between gear box 48 and shaft 43 is formed by a pulley 52 keyed to the output shaft of the gear box 48, a pulley 53 keyed to the shaft 43 and an endless belt 54 trained over pulleys 52, 53. The driving connection between gear box 48 and shaft 45 is formed by a pulley keyed to the output shaft of the gear box, pulley 56 keyed to shaft 45 and an endless belt 57 trained over pulleys 55, 56. Endless belts 54, 57 may be of the cogged belt type in order to insure that the shaft 43 will rotate in timed relationship to the shaft 45.

Referring to FIG. 5, a lower carriage 58 is slidably mounted on posts 37 below table 33 and above journal block 41. Carriage 58 is reciprocated vertically by a cam 59 on shaft 43 which is engaged by a cam follower roller 60 mounted on carriage 58 by a bracket 61. The position of the bracket 61 on carriage 58 may be accurately controlled by a screw 62 threaded in the carriage 58 and engaging the bracket 61. The screw 62 is locked in position by nuts 63. Carriage 58 includes a horizontal flange 64 which is provided with a dovetail track 65 extending transversely of the axis of shaft 43. A lower locating pin plate 66 is slidably mounted in track 65 and supports a plurality of spaced vertically extending pins 67 which extend upwardly through an opening in table 33 and engage the cells of the honeycomb core material when the carriage 58 is moved upwardly. Lower pin plate 66 is reciprocated in track 65 by a driving connection from a cam 68 keyed to shaft 43 (FIGS. 4, 5). An extension 69 is adjustably mounted on one end of the lower pin plate 66 and has a roller 70 mounted thereon. Roller 70 engages an elongated slot 71 in the upper end of a lever 72 which is pivoted intermediate its ends on a fixed bracket 73. An arm 74 is fixed to the other end of lever 72 and a cam follower roller 75 thereon engages the periphery of cam 68. The cam follower roller 75 is yieldingly urged into contact with the cam by a compression spring 76 compressed between the lower end of lever 72 and a fixed support 77.

By this arrangement, the lower pin plate 66 is moved upwardly and downwardly under the action of cam 59 and is reciprocated horizontally under the action of cam 68.

Referring to FIG. 5, an upper carriage 78 is slidably mounted for vertical movement on posts 37 between journal block 44 and table 33. Upper carriage 78 is moved vertically on the posts 37 by a cam 79 which is engaged by a cam follower roller 80 mounted on the carriage 78 by a bracket 81. The position of the cam follower on the carriage may be accurately adjusted, in the same manner as the cam follower on carriage 58, by a screw 82 threaded through a portion of carriage 78 and engaging the bracket 81. Carriage 78 is yieldingly urged upwardly relative to table 33 by compression springs 83 surrounding posts 37 and interposed between the under surface of carriage 78 and the upper surface of table 33.

Upper carriage 78 includes a horizontal flange 84 extending inwardly from the carriage and generally overlying the flange 64 on the lower carriage 58. As shown in FIG. 2, a pressure plate 85 is mounted below the free end of flange 84 by means of stub shafts 86 extending upwardly through the flange 84 and having enlarged heads on the upper ends thereof. Coil springs 87 surrounding the stub shafts 86 and interposed between the undersurface of the flange 84 and the upper surface of the plate 85 yieldingly urge the plate 85 downwardly. Downward movement of the plate is limited by the enlarged heads. An upper locater pin supporting plate 88 is fixed to the undersurface of flange 84 in overlying relationship to the pressure plate 85 and supports a plurality of spaced vertical pins 89 on the undersurface thereof which are adapted to pass through aligned openings in pressure plate 85 when the pressure plate is moved upwardly relative to the pins.

As shown in FIG. 5, the lower ends of posts 38 are fixed to flange 84. A welding carriage 90 is mounted for vertical sliding movement on the posts 38. Welding carriage 90 is moved upwardly and downwardly by a cam 91 keyed to shaft 45 and engaging a cam follower roller 92 mounted on the welding carriage 90 by a bracket 93 which is accurately located on the carriage by a screw 94 engaging the bracket 93. Springs 95 surround the posts 38 and are compressed between the undersurface of welding carriage 90 and the upper surface of flange 94 to yieldingly urge the welding carriage 90 upwardly.

Referring to FIG. 6, an arm 96 of conductive material is pivoted on welding carriage 90 and has a welding roller 97 rotatably mounted at its lower end. Welding roller 97 cooperates with a fixed welding electrode 98 mounted on the plate 85 to engage the crests of adjacent corrugations and weld them together as presently described. Welding roller 97 is yieldingly urged away from welding electrode 98 by a spring 99 interposed between a portion of the arm 96 and a cavity in the welding carriage 90. The force exerted by the spring 99 is controlled by a screw 100 threaded in the welding carriage 90 and engaging the end of the spring 99.

The movement of the arm 96 and in turn the roller 97 away from welding electrode 98 is limited by a set screw 101 threaded in welding carriage 90 and engaging the upper end of arm 96.

Movement of the roller 97 toward and away from electrode 98 is controlled by the pressure of a roller 102 on arm 96.

As shown in FIG. 7, roller 102 is rotatably mounted on a shaft 103 having an enlarged bearing portion 104 so that it is slidable in an opening 105 in flange 84. An intermediate shaft 106 is also positioned in opening 105 and a spring 107 is interposed between flange 104 and an abutment 108 on the end of opening 105, while a spring 109 is interposed between flange 104 and the end of intermediate shaft 106.

As shown in FIG. 6, the opening 105 has an enlarged portion 110 which is slidably contacted by a flange 111 on the end of intermediate shaft 106. An operating shaft 112 is slidably mounted on the free end of the enlarged portion 110. A spring 113 is interposed between flange 111 and an abutment 114. A spring 115 is interposed between flange 111 and the end of shaft 112. A roller 116 is rotatably mounted on the free end of shaft 112 and is adapted to be engaged by a cam extension 117 on cam 79 to move shaft 112 inwardly against the action of spring 110 and in turn move intermediate shaft 106 inwardly against the action of springs 113, 109. This in turn moves the stub shaft 103 inwardly against the action of spring 107.

As shown in FIG. 6, electrical connections are made to the arm 96 which supports the roller electrode 97 and to the pin plate 85 which supports the welding electrode 98 from a welding transformer 118 which is supplied with current from a welding device 119. The welding device is in turn provided with current by a transformer 120. The welding transformer and device are of conventional construction and the specific construction thereof is not a part of this invention. The operation of the welding device periodically to supply current to the welding roller 97 is controlled by a switch 121 having an actuating arm 122 with a roller 123 thereon adapted to engage the periphery of a cam 123a on the shaft 45 (FIGS. 5 and 6).

During the welding operation, the welding electrodes and the article being welded tend to become heated; and it has been found advisable to continuously subject the electrodes and the portion of the article being welded with a liquid coolant such as distilled water. As shown in FIG. 6, this is achieved by providing the liquid coolant in the base pan 36 and placing a pump 124 in the liquid coolant. The pump directs liquid through a conduit 125 to a plurality of valves 126 which control the flow of the coolant to various portions of the welding station through supply tubes 127.

The operation of the welding apparatus described above may be summarized as follows: As previously described, the ribbon or strip of metal is cleaned, corrugated and perforated and thereafter moved in an edgewise relationship onto table 33. In the beginning of the operation, the end of the strip is looped under the table and brought back into registry with an intermediate portion thereof, the crests on the end being aligned with the crests on the intermediate portion. The end is held in position and welded to the intermediate portion and then successive portions of the strip are welded to the previously looped portions at the adjacent crests. The lower locating pins 67 function to assemble the unattached strip to the honeycomb core and move the endless web a predetermined distance along the table 33 while the locating pins 89 maintain the core in proper position to be clamped by plate 85 is accurately aligned relationship so that the crest of the strip may be welded to the corresponding and adjacent crest on the honeycomb core.

Referring to FIGS. 7 through 10, at the beginning of a welding operation, the lower locating pins 67 are in upward position in engagement with the cells of the honeycomb core. As the flange 64 which supports the pin plate 66 moves downwardly, the flange 84 which supports the plate having the upper locating pins 89 thereon moves downwardly to bring the pins 89 into registry with the cells.

As shown in FIG. 8, the lower ends of the pins 89 engage the cells while the upper ends of the pins 67 are still in partial engagement with the cells so that at no time is the honeycomb core material permitted to be uncontrolled. As the pins 89 move downwardly and occupy the entire space of the cells of the core, the pressure plate 85 engages and applies a pressure to the upper end of the honeycomb core and strip. Also, the welding carriage 90 begins its downward movement bringing a cam 128 on the arm 96 into position and engagement with the roller 102. Continued downward movement of the welding carriage 90 brings the welding roller 97 into position adjacent the lower end of a corrugation of the strip S which is to be welded to the crest of an adjacent corrugation on the core. At this time, the cam extension 117 causes, through the movement of the shafts 112, 106 and 103, the arm 96 to pivot inwardly bringing the welding roller 97 into contact with the lower portion of the crest of the strip which is to be welded (FIG. 11). Simultaneously, the switch 121 is actuated by the cam 124 to cause current to flow between welding roller 97 and welding electrode 98. The application of current is continued as the welding carriage 90 is moved upwardly. The welding current is then interrupted and the cam 79 having moved sufficiently to carry the cam extension 117 out of engagement with the roller 116, the welding roller 97, which is by that time near the upper edge of the crest, is permitted to move out of engagement with the corrugated strip.

While the welding is taking place, the plate 66 supporting the lower locating pins 67 is being moved longitudinally of the machine so that at the end of the welding, it is in position to be elevated in order to move the pins 67 into engagement with another group of cells. After the welding roller 97 moves out of engagement with the corrugated strip, the pins 89 begin to move upwardly out of engagement with the cells. At the same time, the lower pins 67 begin to move upwardly into engagement with the cells. As the pins 67 move upwardly, the outer row of pins 67 (on the left in FIGS. 7 through 10) operate to bring an unattached portion of the corrugated metal strip into assembled relation with the honeycomb core which has already been welded.

FIG. 11 shows the relative positions of the strip S and those pins 67 which align and assemble the unattached portion of the strip to the core. Some of the pins 67 engage the corrugations of the unattached portion of the strip to bring at least one crest thereof, and preferably a plurality of crests, into abutting relationship with the crest of the previously formed honeycomb core. Some of the upper pins are also in position to engage the corrugations of the unattached portion. After the upper pins 89 have been moved out of engagement with the cells and the lower pins 67 have been moved into full engagement with the cells, the plate 66 is moved longitudinally of the machine to move the core and bring the next pair of abutting crests into vertical alignment with the welding roller and electrode and thereby position these abutting crests for welding. This completes the cycle. It should be understood that a sufficient number of pins 67, 89 are provided to insure that the core material will be properly located.

We have found that the welding roller preferably should be moved into and out of contact with the crest of the corrugation at a point spaced from the free edges of the corrugation. In this manner, damage to the metal foil strip is prevented. For example, we have found that the roller is preferably moved into contact at a point $\frac{1}{16}$ inch from the bottom edge of the corrugations and moved out of contact with the crest at a point $\frac{1}{16}$ inch from the top edge of the corrugations.

Although we do not know the theory involved, we have found that much more uniform and stronger welds are obtained by moving the welding roller 97 into contact with the lower portion of the corrugation and welding on the upstroke rather than welding on the downstroke. Specifically, as shown in FIGS. 7 through 10, welding roller 97 is out of engagement with the metal strip during its downward movement, is brought into engagement with the strip adjacent the lower edge of the corrugation, and is maintained in contact as it is moved upwardly during which time the welding current is applied.

As the width of the endless web of honeycomb core material is progressively increased, and a predetermined desired width is reached, the web may be severed transversely to provide a length of honeycomb core material. The resultant honeycomb core is of accurate dimensions throughout; that is, the thickness of the core measured axially of the cells and the lateral dimension of the cells are accurate and uniform. We have found that the resultant honeycomb core easily fulfills the high standards set by the aircraft industry, both as to dimensions and strength.

It can be appreciated that as successive welds are made, the endless web of honeycomb material becomes wider and wider. The feeding of this endless web is obtained by the movement of the pins 67 longitudinally of the table 33. In order to facilitate this movement, a secondary table 129 is positioned on the upright supports 35 below table 33. The endless web of honeycomb core material is partially supported by the intermediate table 129 so that the entire weight thereof is not placed upon the pins 67 which are attempting to move the web. In addition, an adjustable arcuate guide surface 130 is provided at the rear end of table 33 and a cylindrical drum 131 having a surface formed of a high-friction material such as rubber is rotatably mounted adjacent the forward end of table 33. The drum 131 is driven periodically to assist the movement of the web past the working station. The periodical movement of the drum is obtained by a driving connection which includes a cam 132 keyed to shaft 43 and having an abutment 133 on the periphery thereof which periodically contacts one end of a lever arm 134 pivoted beneath table 33. The end of the lever 134 is formed with a resilient axially movable member 135 which is contacted by the abutment 133. A latch 136 is slidably mounted at the other end of lever 134 and is adapted to engage the teeth of a gear 137 fixed on the end of the drum 131. Latch 136 is yieldingly urged axially outwardly by a spring 138. Lever 134 is urged in a clockwise direction by a tension spring 139. As shown in FIG. 2, as the cam 132 rotates in a clockwise direction, the abutment 133 engages member 135 and pivots the lever 134 in a counterclockwise direction moving the drum 131 a predetermined amount. The abutment 133 urges the member 35 inwardly and passes by the member 135. Thereafter, the lever 134 returns to its original position under the influence of spring 139. In doing this, the latch 136 passes over one or more of the teeth on gear 137. An adjustable stop 140 is provided and engages the lever 134 to limit its movement under the action of abutment 133 to thereby control the intermittent rotation of the drum 131.

Figure 14:
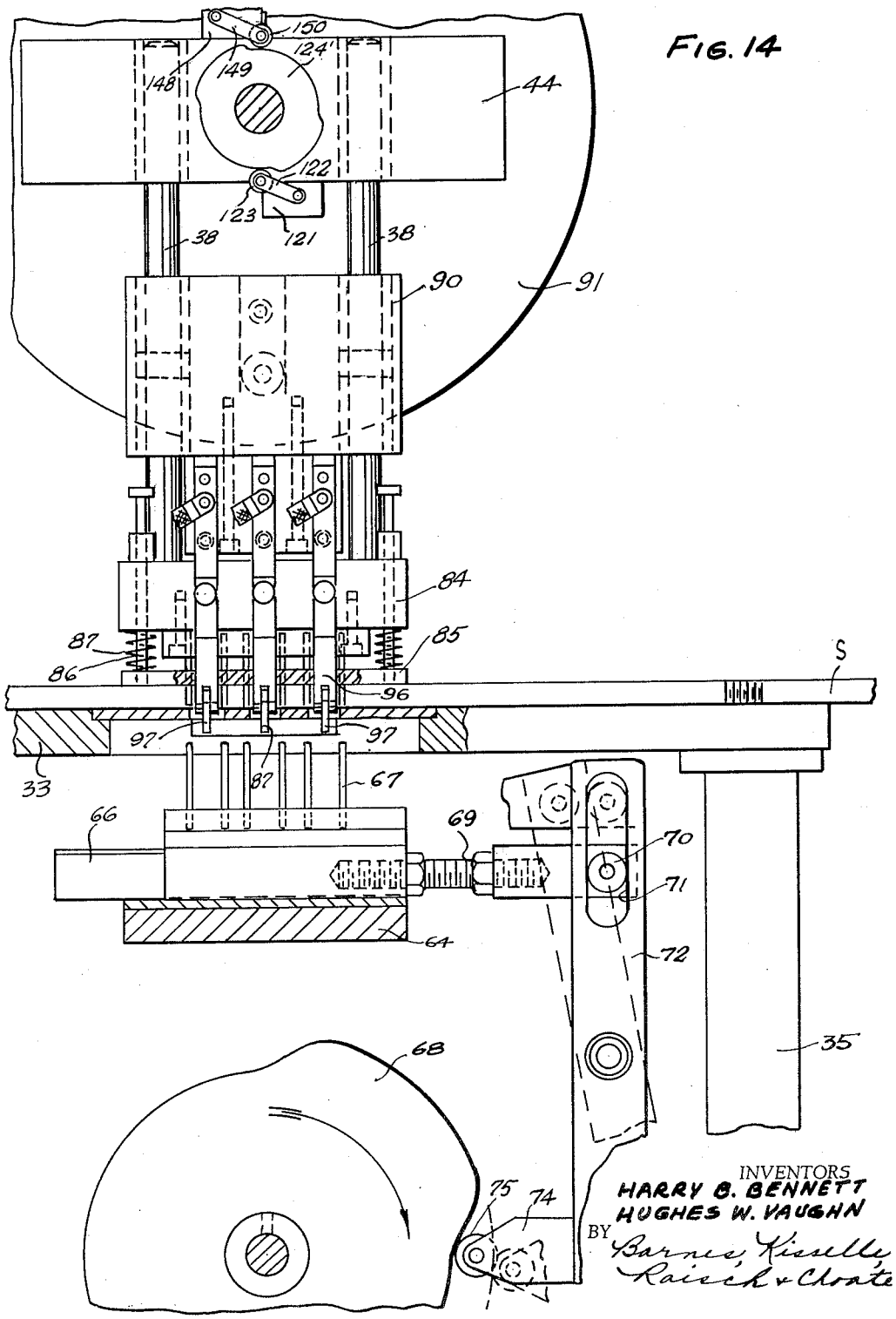
FIG. 14 is a fragmentary sectional view taken along the line 14—14 in FIG. 13.

It has been found that greater production can be achieved by using a plurality of electrodes and simultaneously welding a plurality of adjacent crests. An apparatus for performing this simultaneous welding is shown in FIGS. 13, 14 and diagrammatically in FIG. 12 wherein the welding rollers 97 and welding electrodes 98 are spaced from one another by a predetermined number of crests. The crests engaged by the rollers and welding electrodes are simultaneously welded together and the core of material is then indexed a predetermined amount to bring an additional set of crests into position for welding. The indexing movement of the core material is controlled so that no crest will be welded more than once.

For example, as shown in FIG. 12, the welding rollers and electrodes are separated by an amount corresponding to four crests. However, the core material is indexed an amount corresponding to three crests. In this manner, there is no repetition or rewelding of any crest. More specifically, crest $a$ which is welded by the lefthand roller moves to a position on each successive indexing such that it does not again come into registry with the welding roller 97 and electrode 98.

As shown in FIG. 12, valves are provided with the associated nozzles to provide adequate cooling of the welding operation. The arrangement may comprise a plurality of valves 141 which control the flow from conduit 125 to outlet tubes 142 which are directed against the welding area.

It should, of course, be understood that where a plurality of electrodes are used, it is necessary to provide an operating roller 102 for each electrode. In addition, the number of locating pins 67′ and 89′ is increased to accommodate the greater area of core material that is at the welding station.

Instead of moving the roller 102 inwardly under the action of a cam and roller arrangement 116, 117, a hydraulic arrangement may be used such as shown in FIGS. 13 and 14. In this arrangement, the roller 102 is mounted on a shaft 143 which has an adjustable head 144 thereon. A piston 145 is mounted adjacent the end of the shaft 143 and hydraulic fluid may be periodically provided to this piston. A spring 146 is interposed between the end of the piston 145 and the head 144 while a spring 147 is interposed between the head 144 and the supporting member for the shaft 143.

In order to control the flow of hydraulic fluid to the pistons 145, cam 123b actuates a switch 148 having an arm 149 with a roller 150 engaging the cam. Actuation of the switch 148 energizes a solenoid 151 which controls a valve 152 to permit fluid to flow to or from the pistons 145. The contour of the cam 123b is such that the welding rollers are moved into contact with the crests just prior to energization of the welding circuit.

We claim:
1. The method of making honeycomb core material which comprises positioning a pair of corrugated metal strips on a work surface with the corrugations extending vertically and at least one pair of crests in abutment, applying a pressure to the upper edges of said strips, positioning a welding electrode on one side of one of said abutting crests, moving a second electrode downwardly adjacent the other side of said other abutting crest, maintaining said second electrode out of contact with the other said abutting crest while it is moving downwardly, bringing said second welding electrode into contact with the other said abutting crest adjacent the lower edge thereof, moving said second electrode upwardly while it is in contact with said other crest, and supplying current to said electrodes only while said second electrode is moving upwardly and is in contact with said crest to thereby weld said crests together.

2. The method of making honeycomb core material which comprises assembling a pair of corrugated metal strips with the corrugations extending vertically and at least one pair of crests in abutment, positioning a welding electrode on one side of one of said abutting crests, moving a second electrode downwardly adjacent the other side of said other abutting crest, maintaining said second electrode out of contact with the other said abutting crest while it is moving downwardly, bringing said second electrode into contact with the other said abutting crest at a point adjacent but spaced from the lower edge of said crest, moving said second electrode upwardly while maintaining said electrode in contact with said crest, applying current to said electrodes only while the latter electrode is being moved upwardly in contact with said crest, and withdrawing said second electrode from contact with said crest when said electrode is adjacent but spaced from the upper edge of said crest.

3. The method of making honeycomb core material which comprises positioning a pair of corrugated metal strips on a work surface with the corrugations extending vertically and at least one pair of crests in abutment, applying a pressure to the upper edges of said strips, positioning a welding electrode on one side of one of said abutting crests, moving a second electrode downwardly adjacent the other side of said other abutting crest, maintaining said second electrode out of contact with the other said abutting crest while it is moving downwardly, bringing said second electrode into contact with the other said abutting crest at a point adjacent but spaced from the lower edge of said crest, moving said second electrode upwardly while maintaining said electrode in contact with said crest, applying current to said electrodes only while the latter electrode is being moved upwardly in contact with said crest, and withdrawing said second electrode from contact with said crest when said electrode is adjacent but spaced from the upper edge of said crest.

4. The method of making honeycomb core material which comprises positioning a pair of corrugated metal strips on a work surface with the corrugations extending vertically and at least one pair of crests in abutment, applying a pressure to the upper edges of said strips, positioning a welding electrode on one side of one of said abutting crests, moving a welding roller downwardly adjacent the other side of said other abutting crest, maintaining said welding roller out of contact with said abutting crests while it is moving downwardly, moving said welding roller into contact with the other said abutting crest adjacent the lower end thereof, applying current to said roller only when it is moved upwardly and moving said roller upwardly while maintaining it in contact and while applying current thereto.

5. The method of making honeycomb core material which comprises fastening the end of a corrugated strip of metal to an intermediate portion thereof to form an endless web, successively bringing the crests of subsequent portions of said strip into register with the crests of adjacent portions of said web which has been formed, and bonding adjacent pairs of crests successively by positioning a welding electrode adjacent one of said pair of abutting crests and pushing and pulling a roller back and forth across the other of said crests, maintaining said roller out of contact with said other crest while it is being pushed and holding said roller in contact with said other crest while it is being pulled, and applying current to said electrode and roller only while the roller is being pulled.

6. The method of making honeycomb core material which comprises assembling a pair of corrugated strips with at least one pair of crests of the corrugations in abutment, pivoting an arm having a welding roller thereon into contact with one of said crests adjacent one edge thereof, moving a welding electrode adjacent the other said crest, causing relative movement of said welding roller and crests in a direction generally parallel to said crests toward and away from said pivot point of said welding roller, and moving said roller into contact with said other crest only when relative movement is occurring in a direction away from the pivot point, and applying current to said welding roller and electrode only during said latter movement.

7. An apparatus for forming honeycomb core from corrugated metal strips which comprises a work surface on which a pair of corrugated strips may be supported with the corrugations extending vertically and adjacent crests in abutment, means for applying a downward force on the upper edges of said strips, a welding roller, a welding electrode, means for moving the welding electrode downwardly adjacent one of a pair of said abutting crests which is to be welded, means for moving the welding roller downwardly adjacent the other said abutting crest of said pair, means for moving said welding roller laterally toward and away from said crest and means for controlling said latter means in such a manner that said welding roller is out of contact with said crest during its downward movement and is in contact with said crest during a portion of its upward movement.

8. An apparatus for forming honeycomb core from corrugated metal strips which comprises a frame, a carriage mounted for vertical movement upon said frame, means for moving said carriage vertically on said frame, an arm pivoted to said carriage, a work supporting surface on said frame, said carriage being movable to carry the lower end of said arm into position adjacent said surface, a welding roller on the lower end of said arm, means for yieldingly urging said welding roller laterally toward said work area, and means for controlling said latter means such that said welding roller is moved into contact with said work during upward movement thereof and is moved out of engagement with said work during downward movement thereof.

9. An apparatus for forming honeycomb core from corrugated metal strips which comprises a frame, a work surface on said frame adapted to support a pair of corrugated strips with the corrugations extending vertically and adjacent corrugations in abutting relationship, a first carriage mounted on said frame for vertical movement, a horizontal support mounted on said carriage for lateral horizontal movement, said support having a plurality of locating members thereon adapted to move upwardly into engagement with the cells of a previously fabricated web of core material, a second carriage mounted on said frame for vertical movement and means on said second carriage for engaging said core, and welding means on said frame for welding adjacent abutting crests of the corrugated strips while they are held in position by said latter means.

10. The combination set forth in claim 9 wherein said welding means comprises a third carriage mounted for vertical movement of said frame, an electrode mounted on said second carriage and adapted to be moved into position adjacent one of a pair of abutting crests and a movable electrode mounted on said third carriage and adapted to be moved into position adjacent the other of said pair of abutting crests.

11. The combination set forth in claim 10 including means for moving said movable electrode toward and away from said adjacent crests.

12. An apparatus for forming honeycomb core material from corrugated metal strips comprising means for assembling a pair of corrugated metal strips with at least one pair of crests thereof in abutting relationship, means for supporting an electrode in position adjacent one of said pair of abutting crests, means for pivoting an arm adjacent said strips for movement about an axis generally transverse to the corrugations of said strip, a welding roller on said arm, means for moving said welding roller into contact with the other of said pair of said abutting crests, means for causing relative movement of said crests and said roller in one direction only parallel to said crests and away from the pivot point of said arm, and means for applying current to said welding roller and electrode during said latter movement.

13. An apparatus for forming honeycomb core from corrugated metal strips comprising a frame, a table mounted on said frame and extending generally horizontally, a first horizontal shaft rotatably mounted on said frame below said table, a second horizontal shaft rotatably mounted on said frame above said table, means for rotating said shafts in timed relationship, a first carriage mounted for vertical sliding movement below said table, means actuated by said first shaft for moving said first carriage upwardly and downwardly, locating means on said first carriage movable horizontally, means operable by said first shaft for reciprocating said locating means horizontally on said carriage, said locating means on said first carriage including locating members extending upwardly and adapted to engage the cells of a honeycomb core, a second carriage mounted for vertical sliding movement above said table, means operable by said second shaft for moving said second carriage upwardly and downwardly, means on said second carriage adapted to contact the cells of a honeycomb core and hold said cells against said table, a third carriage mounted on said frame for vertical sliding movement, means operable by said second shaft for moving said third carriage vertically, electrodes mounted on said second and third carriages, respectively, and adapted to be moved into engagement with successive pairs of abutting crests of corrugated material to weld them together.

14. The combination set forth in claim 13 wherein said means actuated by said first shaft for moving said first carriage upwardly and downwardly comprises a cam fixed on said first shaft, and a cam follower mounted on said first carriage and engaging said cam.

15. The combination set forth in claim 13 wherein said means operable by said first shaft for reciprocating said locating means horizontally on said carriage comprises a cam fixed on said horizontal shaft and a cam follower on said locating means engaging said cam.

16. The combination set forth in claim 13 wherein said means operable by said second shaft for moving said second carriage upwardly and downwardly comprises a cam on said second shaft and a cam follower on said second carriage engaging said cam.

17. The combination set forth in claim 13 wherein said means on said second carriage adapted to contact the cells of a honeycomb core comprises a plurality of downwardly extending pins, and a pressure plate mounted on said carriage below said pins, said plate having a plurality of openings through which said pins extend, and means for yieldingly urging said plate downwardly.

18. The combination set forth in claim 13 including an arm on one of said second and third carriages, one of the electrodes being mounted on the lower end of said arm, said arm being pivoted adjacent its upper end to said carriage, means for yieldingly urging said arm outwardly relative to a pair of abutting crests, and means operable by said second horizontal shaft for yieldingly urging said arm inwardly against said latter yielding means toward the pair of abutting crests during a portion of the upward movement of the respective carriage.

19. The combination set forth in claim 18 wherein said means operable on said second arm comprises a cam on said second shaft, a cam follower engaging said cam, and means operatively connecting said arm to said cam follower.

20. The combination set forth in claim 19 wherein said means operatively connecting said cam follower and said arm includes spring means.

21. The combination set forth in claim 19 wherein said means for yieldingly urging said arm toward said pair of abutting crests includes a fluid motor adapted to engage said arm, and means operable by said second shaft to control the flow of fluid to said fluid means.

22. The combination set forth in claim 21 wherein said means operable by said shaft to control the flow of fluid to said fluid means comprises a cam on said second shaft, and valve means operable by said cam.

23. The method of making honeycomb core material which comprises positioning a pair of corrugated metal strips on a work surface with the corrugations extending vertically and at least one pair of crests in abutment, moving said strips in step-by-step fashion past a welding station, applying a pressure to the upper edges of said strips when said strips are at rest at said station, periodically moving a welding electrode into contact with one of the abutting crests when said strips are at rest at said station, moving an electrode upwardly and downwardly at said station, moving said electrode into contact with the other said abutting crest when it is at the lower end of its stroke, maintaining said electrode in pressure contact with said crest during its upward stroke and applying current to said electrodes only while the movable electrode is being moved upwardly.

References Cited in the file of this patent

UNITED STATES PATENTS

| | | |
|---|---|---|
| 2,780,716 | Wasilisin et al. | Feb. 5, 1957 |
| 2,789,203 | Pigo et al. | Apr. 16, 1957 |
| 2,843,722 | Wegeforth | July 15, 1958 |